United States Patent Office.

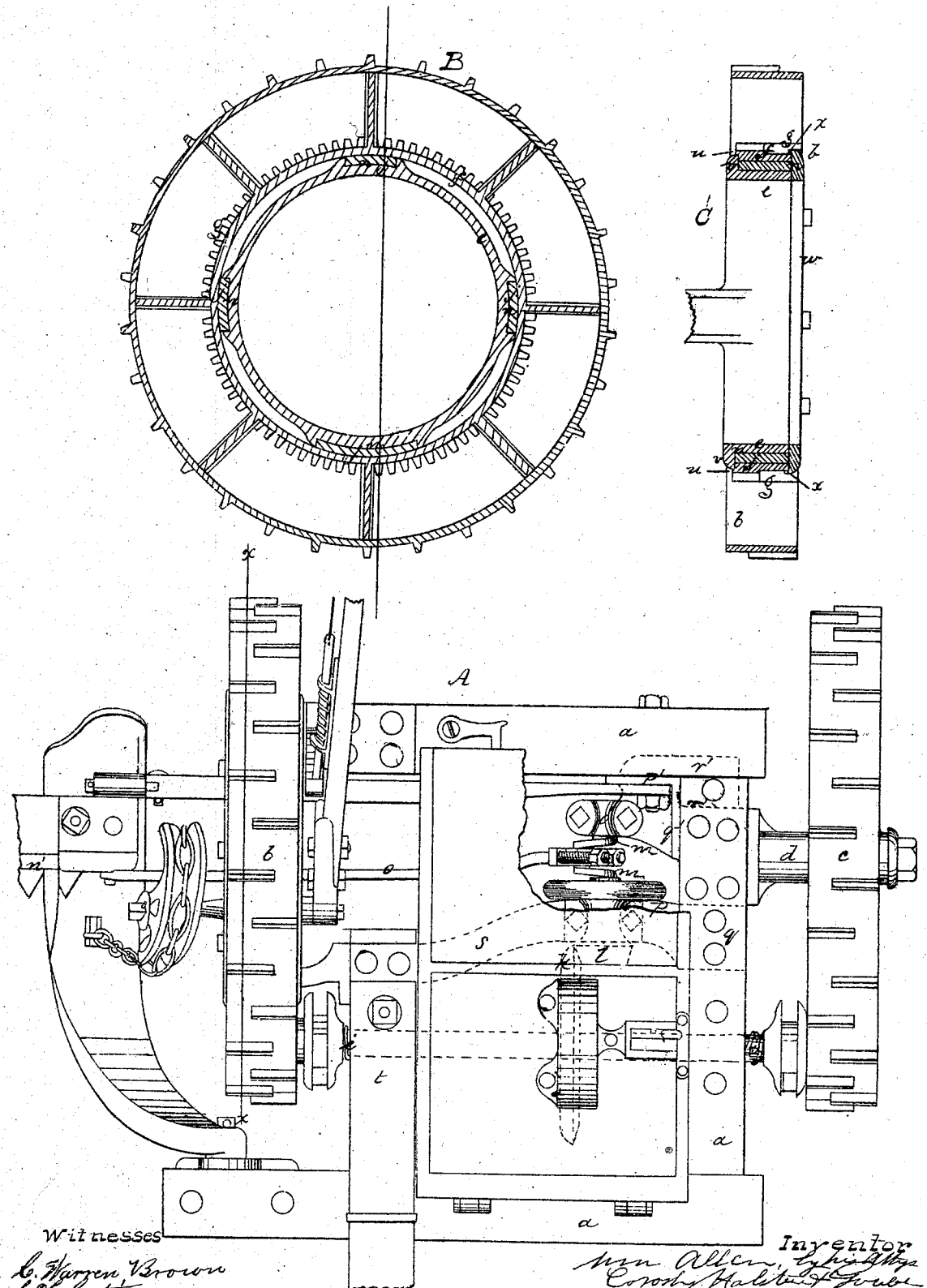

WILLIAM ALLEN, OF WORCESTER, MASSACHUSETTS, ASSIGNOR TO AMES PLOUGH COMPANY.

Letters Patent No. 75,720, dated March 24, 1868.

IMPROVEMENT IN MOWING-MACHINES.

*The Schedule referred to in these Letters Patent and making part of the same.*

TO ALL WHOM IT MAY CONCERN:

Be it known that I, WILLIAM ALLEN, of Worcester, in the county of Worcester, and State of Massachusetts, have invented certain new and useful Improvements in Mowing-Machines; and I do hereby declare that the following, taken in connection with the drawings which accompany and form part of this specification, is a description of my invention sufficient to enable those skilled in the art to practise it.

The invention relates to details of construction of mowing-machines, and consists partly in the relative construction and arrangement of the bearing-surfaces of the inner driving-wheel and the tubular axle or ring upon which it rotates, and partly in the manner of supporting the crank-shaft which reciprocates the cutter-bar.

The drawing represents, at A, a plan of the parts of a mowing-machine upon which my improvements are immediately embodied, while B shows a section of the wheel and tubular axle on the line $x\ x$, and C a central cross-section of the tubular axle and the driving-wheel upon which it is supported.

$a$ denotes the main frame; $b\ c$, the driving and draught-wheels, the outer wheel, $c$, being mounted on the main axle, $d$, and the inner wheel, $b$, upon the tubular axle or ring, $e$, which ring is secured to or forms part of the main frame or body, in the usual manner. The hub $f$, which is directly mounted on the axle $d$, carries or has formed on its outer surface or periphery the driving-gear $g$, which, in connection with the gear upon the opposite wheel, meshes into and drives the pinions on the cross-shaft $i$, to rotate (through bevel-gearing $k\ l$) the crank-shaft $m$, which reciprocates the cutter-bar. The inner surface of the hub $f$ generally rests directly upon the outer surface or periphery of the axle-ring $e$; but, as the friction of the two surfaces in contact soon wears down the metal, I form the axle-ring $e$ somewhat smaller in its general outer diameter than the inner diameter of the hub $d$, and cast in projecting parts of the periphery a series of recesses, $n$, in each of which is supported a shoe or friction-surface, $j$, of Babbiting or similar soft metal; the outer surfaces of which form the direct bearings for the rotating hub or ring-surface.

As the weight of the machine comes mostly on the lower part of the hub, the recess on the lower side of the hub is preferably made largest, so as to form there the greatest Babbited surface, as shown at B.

Instead of applying the Babbiting to recesses formed in the axle, such recesses may be formed in projections from the inner surface of the hub-ring, the periphery of the axle being then made concentric; but the construction shown is preferred.

As ordinarily made and connected together, dirt, gravel, and other extraneous substances, lodge between the inner edge of the axle-ring $e$ and the adjacent surface of the hub, and wear upon and injure the joint. To obviate this, I form the edge of the hub $f$ with a laterally-projecting lip or flange, $u$, which projects over and covers the corner of the rim or flange $v$ of the axle. On the opposite side of the wheel, the face-plate $w$ has, at its outer edge, an inwardly-projecting flange, $x$, which projects over and covers the edge of the axle, as seen at C, this construction securing the joint from all entrance of foreign matters.

In the common mowing-machine, the crank $m$, which drives the cutter-bar $n'$, (through a connecting-rod or link, $o$,) is supported on one overhung bearing, $p$, this bearing being bolted to and projecting from the beam $q$. Such construction is bad, in that the strain upon this bearing soon causes it to spring, and thereby produces undue strain upon the gearing. To obviate these difficulties, I elongate the crank-axle, or extend it rearwards, and support the rear end in an auxiliary bearing, $o'$, this bearing $o'$ having flanges, $p'\ q'\ r'$, by which it is bolted not only upon each side of the angle made by the beams, but also underneath the beams, thus securing the bearing very strongly and firmly in position. In addition to this, I extend an arm, $s$, from the other bearing, across the frame $a$, to the top of the beam $t$, (as shown at A,) and bolt this arm or brace thereto, the support of the crank-shaft being thus rendered very strong and durable.

I claim constructing the hub $f$ with a lip or flange, $u$, to project over and cover the edge of the axle, substantially as shown and described.

Also, constructing the face-plate $w$ with a lip or flange, $x$, to cover and protect the adjacent edge or corner of the hub, substantially as shown and described.

Also, combining with the crank-bearing $p$ an auxiliary bearing, $o'$, secured to the frame $a$ by flanges $p'\ q'\ r'$, substantially as set forth.

WILLIAM ALLEN.

Witnesses:
EDRIC J. RICE,
CHAS. R. AYRES.